J. H. HOLLAND.
AUTOMATIC DRAIN OR RELIEF VALVE.
APPLICATION FILED MAR. 24, 1913.
1,124,437.
Patented Jan. 12, 1915.
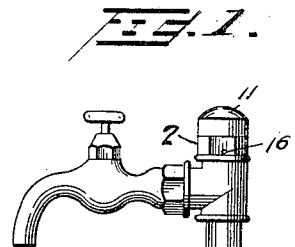
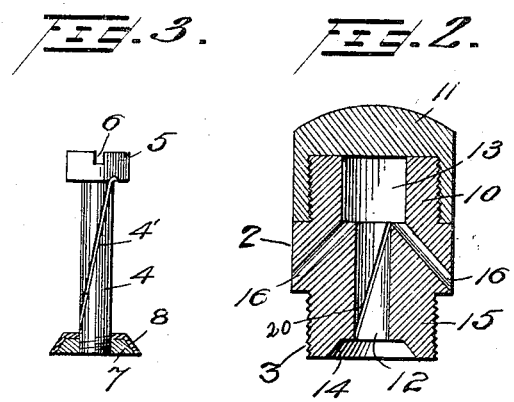
WITNESSES
INVENTOR
Attorney

UNITED STATES PATENT OFFICE.

JAMES H. HOLLAND, OF ATLANTA, GEORGIA, ASSIGNOR OF ONE-HALF TO C. M. SETTLE, OF ATLANTA, GEORGIA.

AUTOMATIC DRAIN OR RELIEF VALVE.

1,124,437. Specification of Letters Patent. Patented Jan. 12, 1915.

Application filed March 24, 1913. Serial No. 756,474.

*To all whom it may concern:*

Be it known that I, JAMES H. HOLLAND, a citizen of the United States, residing at Atlanta, in the county of Fulton and State of Georgia, have invented certain new and useful Improvements in Automatic Drain or Relief Valves; and I do hereby declare the following to be a full, clear, and exact description of the invention, such as will enable others skilled in the art to which it appertains to make and use the same.

This invention relates broadly to drain or relief valves for water mains and pipes, and has particular reference to that type of such devices which are designed for application to residential water pipes.

It is a well known fact that a great deal of damage is caused by the bursting of water pipes in cold weather as a result of carelessness on the part of the occupant of houses in turning off the water supply and failing to drain the pipes.

With a view to eliminating the possibility of the bursting of pipes from the freezing of water inadvertently left therein, this invention aims to provide an automatic drain or release valve which, upon the cutting off of the pressure in the pipes will act to automatically introduce air into the water pipes, thus providing the necessary atmospheric pressure for effectively draining the system.

The above and additional objects are accomplished by such means as are illustrated in the accompanying drawings, described in the following specification and then more particularly pointed out in the claim which is appended hereto and forms a part of this application.

With reference to the drawings, wherein I have illustrated the preferred embodiment of my invention as it is reduced to practice, and throughout the several views of which similar reference numerals designate corresponding parts, Figure 1 is a side elevation of the stand pipe equipped with the relief valve. Fig. 2 is a vertical section of the valve casing, and Fig. 3 is a detail elevation of the preferred form of valve stem and valve. Fig. 4 is a central sectional view through the valve casing showing the valve and valve stem fitted therein.

Proceeding now to the description of the drawing, the preferred form of the valve includes a cored casting 10 formed with an externally disposed nut 2 and provided with a reduced externally screw threaded extension 3 projecting downwardly from the nut 2. Mounted for sliding movement within the housing 1 is a valve stem 4, the upper end of which is headed, as at 5, and provided with the customary screw driver receiving slot 6. The stem 4 is provided with a diagonally extending air passage 4', the upper end of which terminates adjacent the head 5 and the lower end of which terminates adjacent the valve 7. Mounted in screw threaded engagement with the lower terminal of the valve stem 4 is a valve 7. This valve is substantially frusto-conical in shape and carries a rubber, metallic or fiber cap 8 employed for the obvious purpose of tightly sealing the valve connection with the valve seat. The valve stem 4 is slightly greater in length than the longitudinal valve stem receiving bore, formed in the casing 1, to permit the valve 7, when not under pressure, to be spaced from the valve seat 9 formed in the free end of the reduced extension 3.

The cored casting 10 is reduced adjacent its upper portion and externally screw threaded to receive a sealing cap 11 of customary structure. The member 10 is longitudinally bored, as at 12, the upper end of this bore being enlarged, as at 13, to form a receiving chamber for the head 5 of the valve stem, and being of sufficient size to permit the vertical movement of the valve. A valve seat 14 is formed in the lower reduced end 15 of the casting and corresponds in shape to the valve 7. A pair of converging air passages 16 are formed in the casting 10 and communicate at their upper ends with the chamber 13 for a purpose to be hereinafter described. The wall of the bore 12 is provided with a diagonally extending channel 20, which channel is provided for alinement with the diagonally extending air passage 4' formed in the valve stem 4 for increasing the capacity of the air passage.

The actual structure of the valve being thus disclosed, it now remains to describe the operation of the valve when applied to an ordinary water pipe. Briefly it is as follows: Assuming that the pressure is on in the pipe it will be apparent that the valve 7 will be forced upwardly and into sealing engagement with the valve seat 14, at the same time sealing the lower terminal of the air passage 4'. If, however, the pressure in the pipe is cut off the valve 7 immediately drops away from the valve seat 14 thus permitting the air to pass from the exterior of the casing 10 through the passage 4' and thence through the valve seat 14 into the pipe, thereby supplying sufficient atmospheric pressure to effectively drain the water from the pipes. The valve stem 4 is passed through the passage 12 with the headed portion 5 resting in the chamber 13. The cap 11 is then mounted on the casing and the valve 7 is screw threaded to the lower terminal of the stem 4. In this embodiment of the invention it will be seen that when the pressure is admitted to the pipes the valve 7 will be forced into sealing engagement with the seat 14, at the same time sealing the passage 4' and preventing the passage of air from the exterior of the casting into the water pipe. However, immediately upon the cessation of the pressure within the pipe the valve immediately drops away from the seat and the air passes through the passages 16, chamber 13, passage 4', and the valve seat 14, and thence into the pipe, effecting the draining of the pipe, as before.

It is desired to lay emphasis upon the fact that the valve may be readily applied to any water pipe or main by merely screw-tapping an opening in the pipe and screw threading the lower terminal of the valve casting into this opening.

In reduction to practice, I have found that the form of my invention, illustrated in the drawings and referred to in the above description, as the preferred embodiment is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claim.

What I claim is:—

In a device of the character described the combination with a fluid conducting pipe of a casting having a longitudinal bore extending centrally therethrough, said casting having an enlarged portion formed centrally of the ends thereof, said casting upon opposite sides of the enlarged portion being cylindrical and externally screw threaded so that one of the screw threaded portions is adapted for threaded engagement with the fluid pipe, said bore being enlarged at its upper terminal and concaved at its lower terminal to provide a valve seat, a valve adapted for engagement with the valve seat, a valve stem detachably secured to said valve, a head formed integral with the upper terminal of said valve stem and disposed for sliding movement within the enlarged portion of the bore, said valve stem provided with a downwardly extending groove adapted to communicate with the interior of the fluid pipe when the valve is unseated and communicating with the enlarged portion of the bore, said enlarged portion of the casting provided with inwardly extending air passages communicating with the atmosphere at their outer terminals and with the enlarged portion of the bore at their inner terminals and a cap removably secured to the upper screw threaded portion of the casting and normally in engagement with the enlarged portion of the casting.

In testimony whereof I affix my signature in presence of two witnesses.

JAMES H. HOLLAND.

Witnesses:
J. D. CHILDRESS,
L. T. CARTER.